United States Patent
Vanman et al.

(10) Patent No.: US 11,115,602 B2
(45) Date of Patent: Sep. 7, 2021

(54) EMULATING LIGHT SENSITIVITY OF A TARGET

(71) Applicant: WatchGuard, Inc., Allen, TX (US)

(72) Inventors: Robert V. Vanman, McKinney, TX (US); James Walter Exner, Plano, TX (US)

(73) Assignee: WATCHGUARD VIDEO, INC., Allen, TX (US)

( * ) Notice: Subject to any disclaimer, the term of this patent is extended or adjusted under 35 U.S.C. 154(b) by 29 days.

(21) Appl. No.: 16/437,957

(22) Filed: Jun. 11, 2019

(65) Prior Publication Data

US 2020/0396366 A1 Dec. 17, 2020

(51) Int. Cl.
*H04N 5/235* (2006.01)
*G06F 16/58* (2019.01)

(52) U.S. Cl.
CPC .......... *H04N 5/2353* (2013.01); *G06F 16/58* (2019.01); *H04N 5/2351* (2013.01)

(58) Field of Classification Search
CPC .... H04N 5/235; H04N 5/2351; H04N 5/2352; H04N 5/2353; G06F 16/58; G06F 16/583; G06F 16/5866; G06F 16/587
See application file for complete search history.

(56) References Cited

U.S. PATENT DOCUMENTS

| | | |
|---|---|---|
| 7,173,663 B2 | 2/2007 | Skow et al. |
| 8,165,416 B2 | 4/2012 | Cutler |
| 2005/0057666 A1 | 3/2005 | Hu et al. |
| 2006/0274161 A1 | 12/2006 | Ing et al. |
| 2007/0279373 A1 | 12/2007 | Tseng et al. |
| 2009/0268023 A1 | 10/2009 | Hsieh |
| 2011/0169950 A1 | 7/2011 | Weaver |

(Continued)

FOREIGN PATENT DOCUMENTS

| | | |
|---|---|---|
| EP | 2800352 A1 | 11/2014 |
| JP | 2005184586 A | 7/2005 |
| WO | 2012155951 A1 | 11/2012 |

OTHER PUBLICATIONS

AXON; "The Making of Axon Body 3: Video Magic in Tampere, Finland"; https://www.axon.com/company/news/ab3-series-1; Jun. 5, 2019; 4 pages.

(Continued)

*Primary Examiner* — Padma Haliyur
(74) *Attorney, Agent, or Firm* — Daniel R. Bester

(57) ABSTRACT

In an embodiment, a method of emulating light sensitivity of a target includes, for each of at least some frames of a video recording, receiving an image. The method also includes accessing image metadata associated with the image. The method also includes discovering, from the image metadata, information related to an exposure setting and a gain value used by a camera in capture of the image. The method also includes deriving, from stored camera metadata for the camera, information related to a luminous flux associated with the exposure setting and the gain value used by the camera in the capture of the image. The method also includes determining an adjusted gain value corresponding to a target light sensitivity using the derived information related to the luminous flux. The method also includes generating an adjusted image using the adjusted gain value.

18 Claims, 4 Drawing Sheets

(56) References Cited

U.S. PATENT DOCUMENTS

| | | | | |
|---|---|---|---|---|
| 2012/0177352 A1* | 7/2012 | Pillman | ............... | H04N 5/2354 |
| | | | | 396/61 |
| 2013/0128074 A1 | 5/2013 | Mitsugi | | |
| 2013/0300894 A1 | 11/2013 | Imai et al. | | |
| 2015/0243200 A1* | 8/2015 | Pan | ....................... | G06T 5/009 |
| | | | | 345/590 |
| 2016/0005153 A1* | 1/2016 | Atkins | ..................... | H04N 9/67 |
| | | | | 345/591 |
| 2016/0366444 A1 | 12/2016 | Sullivan | | |
| 2017/0243337 A1 | 8/2017 | Griffin | | |
| 2019/0320106 A1* | 10/2019 | Tatara | ..................... | B60Q 1/08 |
| 2020/0013151 A1* | 1/2020 | Atkins | ................... | G06T 5/009 |

OTHER PUBLICATIONS

The International Search Report and the Written Opinion, corresponding serial No. PCT/US2020/035884 filed: Jun. 3, 2020, dated Sep. 14, 2020, all pages.

\* cited by examiner

EMULATING LIGHT SENSITIVITY OF A TARGET

BACKGROUND

Technical Field

The present disclosure relates generally to media capture and more particularly, of by way of limitation, to emulating light sensitivity of a target.

History of Related Art

It has recently become desirable to record video of encounters between police and members of the public. In some instances, video recordings are collected from an officer's vantage point by a device associated with the officer. Due to advancements in technology, these video recordings potentially show events in greater detail and with better lighting than what was perceived by the officer. As a result, there are difficulties associated with using such video recordings to evaluate the officer's actions.

SUMMARY OF THE INVENTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In an embodiment, one general aspect includes a method of emulating light sensitivity of a target, the method including, for each of at least some frames of a video recording, receiving an image. The method also includes accessing image metadata associated with the image. The method also includes discovering, from the image metadata, information related to an exposure setting and a gain value used by a camera in capture of the image. The method also includes deriving, from stored camera metadata for the camera, information related to a luminous flux associated with the exposure setting and the gain value used by the camera in the capture of the image. The method also includes determining an adjusted gain value corresponding to a target light sensitivity using the derived information related to the luminous flux. The method also includes generating an adjusted image using the adjusted gain value. Other embodiments of this aspect include corresponding computer systems, apparatus, and computer programs recorded on one or more computer storage devices, each configured to perform the actions of the methods.

In an embodiment, another general aspect includes a method of emulating light sensitivity of a target during video playback, the method including, by a computer system, initiating playback of a video recording. The method also includes publishing the video recording for display responsive to the initiating. The publishing includes, for each of at least some frames of the video recording, receiving an image. The publishing also includes accessing image metadata associated with the image. The publishing also includes discovering, from the image metadata, information related to an exposure setting and a gain value used by a camera in capture of the image. The publishing also includes deriving, from stored camera metadata for the camera, information related to a luminous flux associated with the exposure setting and the gain value used by the camera in the capture of the image. The publishing also includes determining an adjusted gain value corresponding to a target light sensitivity using the derived information related to the luminous flux. The publishing also includes generating an adjusted image using the adjusted gain value. The publishing also includes providing the adjusted image for display. Other embodiments of this aspect include corresponding computer systems, apparatus, and computer programs recorded on one or more computer storage devices, each configured to perform the actions of the methods.

In an embodiment, another general aspect includes a computer system that includes a processor and memory, where the processor and memory in combination perform a method. The method includes, for each of at least some frames of a video recording, receiving an image. The method also includes accessing image metadata associated with the image. The method also includes discovering, from the image metadata, information related to an exposure setting and a gain value used by a camera in capture of the image. The method also includes deriving, from stored camera metadata for the camera, information related to a luminous flux associated with the exposure setting and the gain value used by the camera in the capture of the image. The method also includes determining an adjusted gain value corresponding to a target light sensitivity using the derived information related to the luminous flux. The method also includes generating an adjusted image using the adjusted gain value.

BRIEF DESCRIPTION OF THE DRAWINGS

For a more complete understanding of the present invention thereof, reference may now be had to the following description taken in conjunction with the accompanying drawings, in which.

DETAILED DESCRIPTION

A recording device, such as a wearable microphone or video camera, can create numerous recordings of live media streams. A media stream can include video, audio, combinations of same, and/or the like. A captured media stream typically includes an audio and/or video recording. Video recordings, for example, can include a sequence of video frames, or images. Police agencies that implement police body cameras, for example, often create thousands to even millions of recordings of live media streams.

With advances in back-illuminated image sensors, light sensitivity of image sensors is usually greater than that of the human visual system. Consequently, cameras are often able to capture images of events occurring in low light conditions in a way that does not accurately represent what was visible to people in or near the events. This can be concerning in settings such as law enforcement, where officers are regularly evaluated after-the-fact based in part on circumstances shown in video recordings.

The present disclosure describes examples of systems and methods for emulating a light sensitivity of a target, such as a human, so that live media streams and, more particularly, video recordings, can be played back in a manner that approximates what a typical or hypothetical human would have seen in a given environment. Various embodiments of the present disclosure will now be described more fully with reference to the accompanying drawings. The invention may, however, be embodied in many different forms and should not be construed as limited to the embodiments set forth herein.

Figure 1:
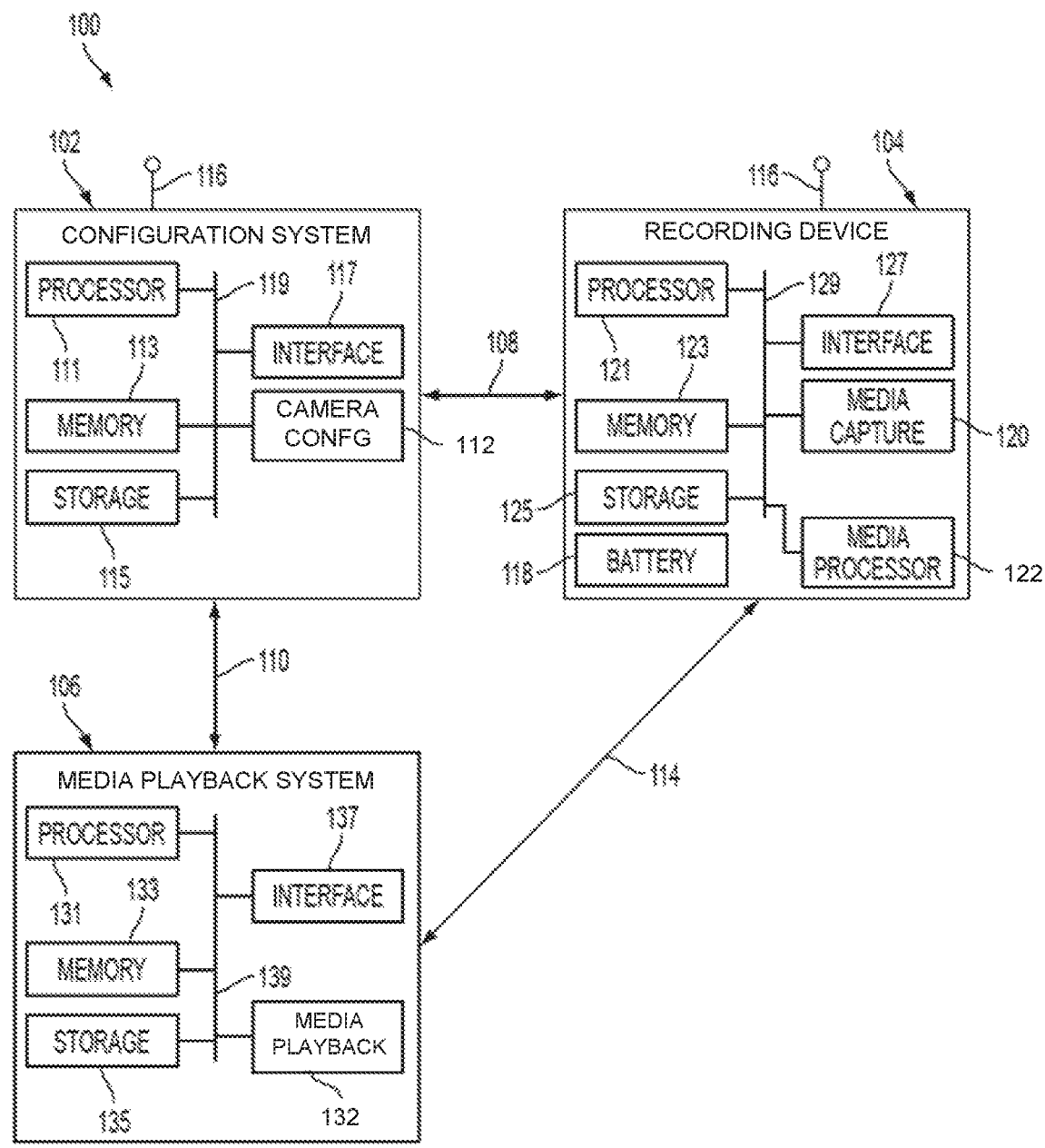
FIG. 1 illustrates an example of a system for emulating light sensitivity of a target.

FIG. 1 illustrates an example of a system 100 for emulating light sensitivity of a target. The system 100 can include a configuration system 102, a recording device 104, and a media playback system 106. In certain embodiments, the configuration system 102 can be communicably coupled to the recording device 104 and the media playback system 106 via a communication link 108 and a communication link 110, respectively. In addition, in certain embodiments, the recording device 104 can be communicably coupled to the media playback system 106 via a communication link 114. The communication links 108, 110 and 114 can be representative of wired and/or wireless communication. In some cases, the communication links 108, 110 and 114 can represent links that are periodically established, for example, in order to transfer data therebetween (e.g., configurations from the configuration system 102 to the recording device 104 or captured media from the recording device 104 to the media playback system 106 and/or the configuration system 102).

The configuration system 102 is typically operable to receive, process, and store media such as audio and/or video as it is received from the recording device 104 and/or other media, sources, generally for purposes of configuring the recording device 104. It should be appreciated that the configuration system 102 may not be present in some embodiments. The media playback system 106 can, in some embodiments, be implemented as a central storage system that stores captured media from multiple recording devices similar to the recording device 104.

The configuration system 102, recording device 104, and media playback system 106 may each include one or more portions of one or more computer systems. In particular embodiments, one or more of these computer systems may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of configuration system 102, recording device 104, and media playback system 106 may comprise any suitable physical form, configuration, number, type and/or layout. As an example, and not by way of limitation, configuration system 102, recording device 104, and/or media playback system 106 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, configuration system 102, recording device 104, and/or media playback system 106 may include one or more computer systems; be unitary or distributed; span multiple locations; span multiple machines; or reside in a cloud, which may include one or more cloud components in one or more networks.

In the depicted embodiment, configuration system 102, recording device 104, and media playback system 106 each include their own respective processors 111, 121, and 131; memory 113, 123, and 133; storage 115, 125, and 135; interfaces 117, 127, and 137; and buses 119, 129, and 139. Although a system is depicted having a particular number of particular components in a particular arrangement, this disclosure contemplates any system having any suitable number of any suitable components in any suitable arrangement. For simplicity, similar components of configuration system 102, recording device 104, and media playback system 106 will be discussed together while referring to the components of configuration system 102. However, it is not necessary for these devices to have, the same components, or the same type of components. For example, processor 111 may be a general purpose microprocessor and processor 121 may be an application specific integrated circuit (ASIC).

Processor 111 may be a microprocessor, controller, or any other suitable computing device, resource, or combination of hardware, software and/or encoded logic operable to provide, either alone or in conjunction with other components, (e.g., memory 113) wireless networking functionality. Such functionality may include providing various features discussed herein. In particular embodiments, processor 111 may include hardware for executing instructions, such as those making up a computer program. As an example and not by way of limitation, to execute instructions, processor 111 may retrieve (or fetch) instructions from an internal register, an internal cache, memory 113, or storage 115; decode and execute them; and then write one or more results to an internal register, an internal cache, memory 113, or storage 115.

In particular embodiments, processor 111 may include one or more internal caches for data, instructions, or addresses. This disclosure contemplates processor 111 including any suitable number of any suitable internal caches, where appropriate. As an example and not by way of limitation, processor 111 may include one or more instruction caches, one or more data caches, and one or more translation lookaside buffers (TLBs). Instructions in the instruction caches may be copies of instructions in memory 113 or storage 115 and the instruction caches may speed up retrieval of those instructions by processor 111. Data in the data caches may be copies of data in memory 113 or storage 115 for instructions executing at processor 111 to operate on; the results of previous instructions executed at processor 111 for access by subsequent instructions executing at processor 111, or for writing to memory 113, or storage 115; or other suitable data. The data caches may speed up read or write operations by processor 111. The TLBs may speed up virtual-address translations for processor 111. In particular embodiments, processor 111 may include one or more internal registers for data, instructions, or addresses. Depending on the embodiment, processor 111 may include any suitable number of any suitable internal registers, where appropriate. Where appropriate, processor 111 may include one or more arithmetic logic units (ALUs); be a multi-core processor; include one or more processors 111; or any other suitable processor.

Memory 113 may be any form of volatile or non-volatile memory including, without limitation, magnetic media, optical media, random access memory (RAM), read-only memory (ROM), flash memory, removable media, or any other suitable local or remote memory component or components. In particular embodiments, memory 113 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 113 may include one or more memories 113, where appropriate. Memory 113 may store any suitable data or information utilized by configuration system 102, including software embedded in a computer readable medium, and/or encoded logic incorporated in hardware or otherwise stored (e.g., firmware). In particular embodiments, memory 113 may include main memory for storing instructions for processor 111 to execute or data for processor 111 to operate on. In particular embodiments, one or more memory management units (MMUs) may reside between processor 111 and memory 113 and facilitate accesses to memory 113 requested by processor 111.

As an example and not by way of limitation, configuration system 102 may load instructions from storage 115 or another source (such as, for example, another computer system) to memory 113. Processor 111 may then load the instructions from memory 113 to an internal register or internal cache. To execute the instructions, processor 111 may retrieve the instructions from the internal register or internal cache and decode them. During or after execution of the instructions, processor 111 may write one or more results (which may be intermediate or final results) to the internal register or internal cache. Processor 111 may then write one or more of those results to memory 113. In particular embodiments, processor 111 may execute only instructions in one or more internal registers or internal caches or in memory 113 (as opposed to storage 115 or elsewhere) and may operate only on data in one or more internal registers or internal caches or in memory 113 (as opposed to storage 115 or elsewhere).

In particular embodiments, storage 115 may include mass storage for data or instructions. As an example and not by way of limitation, storage 115 may include a hard disk drive (HDD), a floppy disk drive, flash memory, an optical disc, a magneto-optical disc, magnetic tape, or a Universal Serial Bus (USB) drive or a combination of two or more of these. Storage 115 may include removable or non-removable (or fixed) media, where appropriate. Storage 115 may be internal or external to configuration system 102, where appropriate. In particular embodiments, storage 115 may be non-volatile, solid-state memory. In particular embodiments, storage 115 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 115 may take any suitable physical form and may comprise any suitable number or type of storage. Storage 115 may include one or more storage control units facilitating communication between processor 111 and storage 115, where appropriate.

In particular embodiments, interface 117 may include hardware, encoded software, or both providing one or more interfaces for communication (such as, for example, packet-based communication) among configuration system 102, recording device 104, media playback system 106, any networks, any network devices, and/or any other computer systems. As an example and not by way of limitation, communication interface 117 may include a network interface controller (NIC) or network adapter for communicating with an Ethernet or other wire-based network and/or a wireless NIC (WNIC) or wireless adapter for communicating with a wireless network.

In some embodiments, interface 117 comprises one or more radios coupled to one or more physical antenna ports 116. Depending on the embodiment, interface 117 may be any type of interface suitable for any type of network with which the system 100 is used. As an example and not by way of limitation, the system 100 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the system 100 can include (or communicate with) a wireless PAN (WPAN) (such as, for example, a BLUETOOTH WPAN), a network, a WI-MAX network, an LTE network, an LTE-A network, a cellular telephone network (such as, for example, a Global System for Mobile Communications (GSM) network), or any other suitable wireless network or a combination of two or more of these. configuration system 102 may include any suitable interface 117 for any one or more of these networks, where appropriate.

In some embodiments, interface 117 may include one or more interfaces for one or more I/O devices. One or more of these I/O devices may enable communication between a person and configuration system 102. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 117 for them. Where appropriate, interface 117 may include one or more drivers enabling processor 111 to drive one or more of these I/O devices. Interface 117 may include one or more interfaces 117, where appropriate.

Bus 119 may include any combination of hardware, software embedded in a computer readable medium, and/or encoded logic incorporated in hardware or otherwise stored (e.g., firmware) to couple components of configuration system 102 to each other. As an example and not by way of limitation, bus 119 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PO-X) bus, a serial advanced technology attachment (SATA) bus, a Video Electronics Standards Association local (VLB) bus, or any other suitable bus or a combination of two or more of these. Bus 119 may include any number, type, and/or configuration of buses 119, where appropriate. In particular embodiments, one or more buses 119 (which may each include an address bus and a data bus) may couple processor 111 to memory 113. Bus 119 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 111 (such as, for example, one or more internal registers or caches), one or more portions of memory 113, one or more portions of storage 115, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Referring more specifically to the recording device 104, the recording device 104 can further include a media capture component 120, a media processor 122 and a battery 118, The media capture component 120 can include video-capture hardware and/or software (e.g., a camera), audio-capture hardware and/or software (e.g., a microphone), combinations of same, and/or the like. In a typical embodiment, the media capture component 120 enables the recording device 104 to capture a live media stream for processing and storage. An example of the media capture component 120 will be described relative to FIG. 2. The battery 118 typically provides a limited power source to the recording device 104.

The media processor 122 of the recording device 104 can include software and/or hardware to process a live media stream and store the live media stream in the storage 125 in the form of a database. More particularly, the media processor 122 can compress or encode video recordings using a codec such as, for example, H.264 or H.265. In general, the encoding can include encoding image metadata as part of a video file that includes all or a portion of a given video recording, where each video frame is an image. In various cases, image metadata can be encoded for each video frame, for every so many video frames (e.g., every five), or only when the image metadata changes. Other examples will be apparent to one skilled in the art after reviewing the present disclosure.

The image metadata can include, for each image for which image metadata is encoded, information related to an exposure setting and a gain value used by the recording device 104 in capture of the image. In various cases, the exposure setting and/or the gain value can be reported globally for the image. In other cases, the gain value and/or the exposure setting can be reported for each pixel of the image. In that way, the image metadata is accessible and available for use upon video playback. In some embodiments, the media processor 122 of the recording device 104 can continuously send the video recording, as it is encoded, to the media playback system 106 over the communication link 114.

The gain value can refer to a magnitude of amplification applied to an image, often reported in electrons per analog-to-digital unit (e.g., in dB). In general, the exposure setting is representative of the amount of light allowed to enter an image sensor. In some embodiments, the exposure setting can include a plurality of different metrics, and/or a composite metric representative of the same. For example, the exposure setting can include a shutter speed that measures how long light is permitted to enter, for example, the media capture component 120 (e.g., in seconds). In another example, the exposure setting can include an aperture setting such as an f-stop value. In yet another example, the exposure setting can include an ISO speed. In still another example, the exposure setting can be an exposure value that represents a combination of a shutter speed and an f-stop value, or a metric that is computed from such value in combination with scene luminance, where the computed metric is measurable in lux seconds. In other examples, the exposure setting can represent a mode of the media capture component 120 that represents a specific combination of settings similar to the example values, settings and metrics described above.

The configuration system 102 can further include a camera configuration module 112. The camera configuration module 112 can generate camera metadata specifically for the recording device 104, which camera metadata is stored in the storage 115 and shared with media playback systems, such as the media playback system 106, over the communication link 110. In various embodiments, the camera configuration module 112 can also configure, or cause, the recording device 104 to encode image metadata of the type described above, to the extent the recording device 104 is not already configured to do so. Example operation of the camera configuration module 112 will be described in greater detail relative to FIG. 3.

The camera metadata which is generated by the camera configuration module 112 can include, for example, a lookup table that maps exposure settings and gain values to information related to a luminous flux, such as a luminous flux per unit area. Generally, each luminous flux per unit area is reflective of what the corresponding light sensitivity of a target would be for a specific combination of an exposure setting and a gain value, and is measurable in units of lux. More particularly, each luminous flux per unit area reflects human light sensitivity for the corresponding values of exposure and gain for a given recording device, such as the recording device 104. The relationship between the luminous flux per unit area and different combinations of exposure settings and gain values can vary based on a model of device. Therefore, in a typical embodiment, the camera metadata can be individually generated for the recording device 104, and the camera configuration module 112 can similarly generate camera metadata on an individualized basis for a plurality of other recording devices similar to the recording device 104.

The media playback system 106 can include a media playback module 132. The media playback module 132 can store camera metadata of the type discussed above in the storage 135. In that way, upon playback of a given video file, the media playback module 132 can access the camera metadata for the recording device 104 and, based at least partly thereon, generate an adjusted image that depicts events using a light sensitivity of a typical or hypothetical human. Example operation of the media playback module 132 will be described in greater detail relative to FIG. 4.

For simplicity of illustration, the configuration system 102, the recording device 104, and the media playback system 106 are shown separately and singly in FIG. 1. It should be appreciated that, in various embodiments, each of the configuration system 102, the recording device 104, and the media playback system 106 can be representative of a plurality of such systems or devices. For example, the system 100 can include a plurality of recording devices similar to the recording device 104, where the configuration system 102 generates, stores, and shares camera metadata for each of the plurality of recording devices. Furthermore, in many cases, a device or system that performs the function of one of the configuration system 102, the recording device 104, and the media playback system 106 can also perform any of the functionality of any other of these systems or devices.

Figure 2:
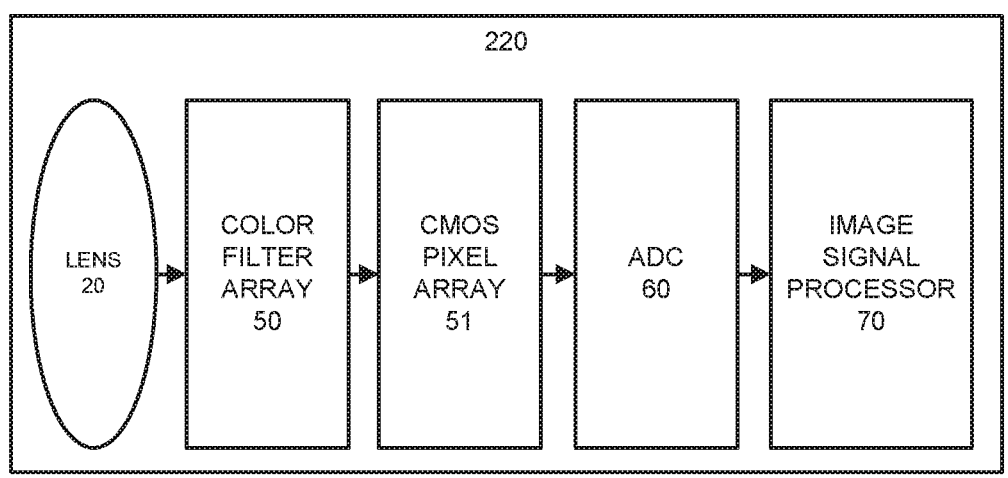
FIG. 2 illustrates an example of a media capture component that functions as a camera.

FIG. 2 illustrates an example of a media capture component 220 that functions as a camera. In various embodiments, the media capture component 220 can operate as described with respect to the media capture component 120 of FIG. 1. The media capture component 220 has a lens 20 that focuses light onto a Complementary Metal Oxide Semiconductor (CMOS) imaging sensor 50. The CMOS imaging sensor 50 can include a CMOS pixel array 51 that may have a color filter array 52, such as a Bayer color filter matrix, thereon. Signals created by the pixels on the CMOS sensor are converted to digital signals via an analog to digital converter (ADC) 60. There can be either a single ADC 60 having multiplexed inputs or an ADC 60 for each pixel. The ADC 60 outputs digital data to an image signal processor (ISP) 70 that can perform various functions such as, for example, automatic gain control (AGC), automatic exposure control (AEC), image stabilization, color encoding, computer data bus interfacing, and multi-resolution imaging.

Figure 3:
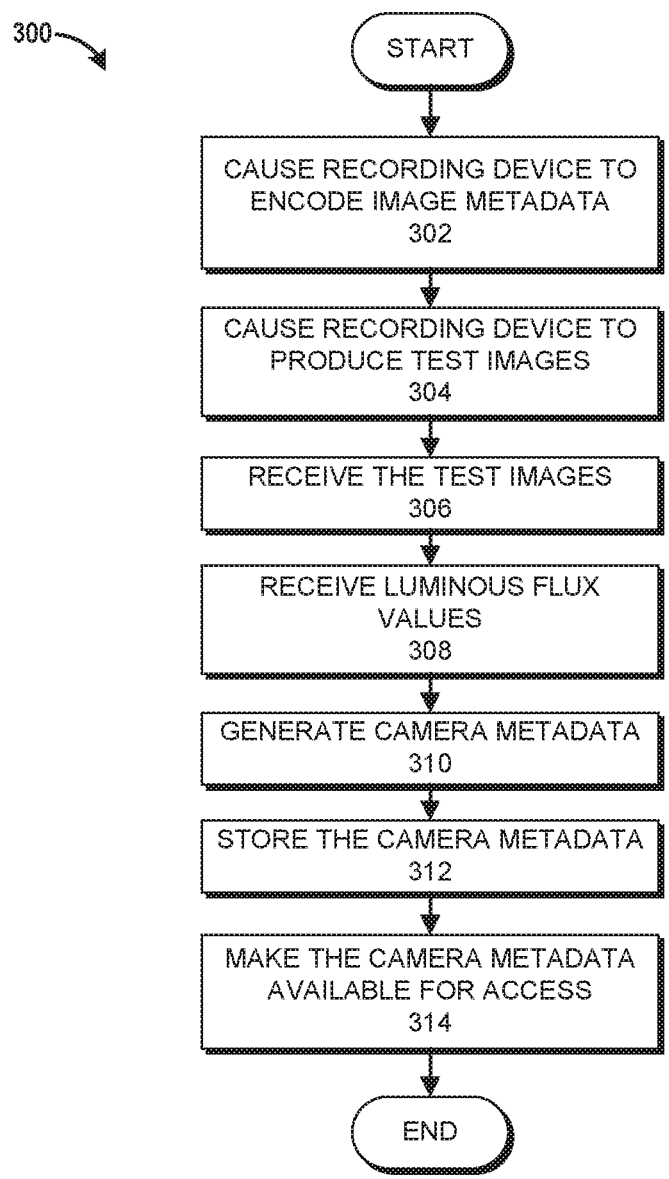
FIG. 3 illustrates an example of a process for configuring camera metadata.

FIG. 3 illustrates an example of a process 300 for configuring camera metadata. In certain embodiments, a process similar to the process 300 can be initiated whenever a new model of camera or recording device is introduced into a playback environment. In various embodiments, with reference to FIG. 1, the process 300 can be executed, in whole or in part, by the configuration system 102, the recording device 104, the media playback system 106 and/or particular components thereof. Although any number of computer systems can be involved in executing the process 300, for simplicity of description, the process 300 will be described with respect to the configuration system 102, the camera configuration module 112, and the recording device 104.

At block 302, the camera configuration module 112 causes the media processor 122 of the recording device 104 to encode image metadata that includes exposure settings and gain values as described relative to FIG. 1. In various embodiments, the block 302 can include issuing a command to the recording device 104 over the communication link 108, or using a configuration interface provided by the recording device 104. In some embodiments, the recording device 104 may already be configured to encode such image metadata. In these embodiments, the block 302 can be omitted.

At block 304, the camera configuration module 112 causes the recording device 104 to produce test images that result in the encoding of different combinations of exposure settings and gain values as image metadata. In certain embodiments, the block 304 can, at least in part, be a user-guided process that is conducted in a controlled environment such as a dark room, where lighting is varied for different images so as to provoke the utilization of the different combinations of exposure settings and gain values by the media capture component 120 of the recording device 104.

At block 306, the camera configuration module 112 receives the test images with encoded image metadata that specifies exposure settings and gain values. At block 308, the camera configuration module 112 receives luminous flux values, such as luminous flux per unit area, corresponding to each pair of an exposure setting and gain value. In various embodiments, the luminous flux values can be supplied by a lux meter. In some cases, a user can supply the luminous flux values. In some embodiments, the luminous flux values can be supplied by a sensor incorporated into the recording device 104.

At block 310, the camera configuration module 112 generates camera metadata for the recording device 104. In a typical embodiment, the camera metadata includes information sufficient to resolve a combination of an exposure setting and a gain value to a multiplier that can be used to adjust the gain value to approximate a light sensitivity of a configurable target, such as a typical or hypothetical human.

In an example, in some embodiments, the generated camera metadata at the block 310 can be a lookup table, where a combination of an exposure setting and a gain value can be used to retrieve a corresponding luminous flux per unit area. In such cases, the media playback module 132 of the media playback system 106, for example, can use the corresponding luminous flux per unit area to adjust a given gain value for playback. In another example, in some embodiments, the generated camera metadata can be a lookup table, where a combination of an exposure setting and a gain value can be used to retrieve a specific adjustment that should be made (e.g., a multiplier to apply to a given gain value). Other examples will be apparent to one skilled in the art after reviewing the present disclosure. Further examples of camera metadata and corresponding gain adjustments will be described relative to FIG. 4.

At block 312, the camera configuration module 112 stores the camera metadata in the storage 115 in relation to an identifier for the recording device 104. In various embodiments, the camera configuration module 112 can store camera metadata for a plurality of different capture devices which may be used to provide video files for playback. At block 314, the camera configuration module 112 makes the camera metadata available for access. For example, the camera configuration module 112 can share the camera metadata with computer systems used for video playback such as, for example, the media playback system 106. After block 314, the process 300 ends.

Figure 4:
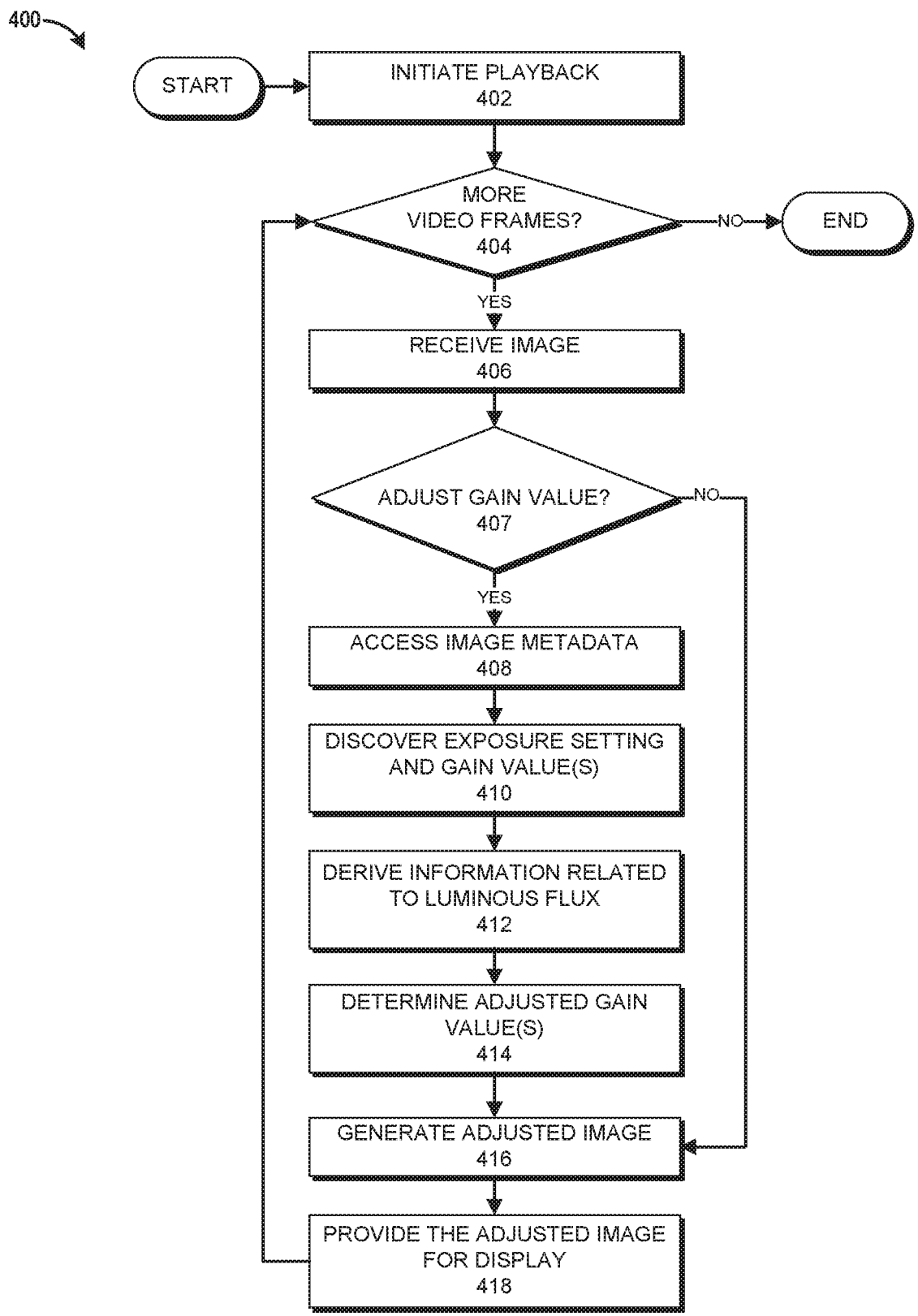
FIG. 4 illustrates an example of a process for emulating a light sensitivity of a target during video playback.

FIG. 4 illustrates an example of a process 400 for emulating a light sensitivity of a target during video playback. In certain embodiments, a process similar to the process 400 can begin when playback of a video recording is initiated, for example, by a user. In various embodiments, with reference to FIG. 1, the process 400 can be executed, in whole or in part, by the configuration system 102, the recording device 104, the media playback system 106 and/or particular components thereof. Although any number of computer systems can be involved in executing the process 400, for simplicity of description, the process 400 will be described with respect to the media playback system 106, the media playback module 132, and the recording device 104.

At block 402, the media playback module 132 initiates playback of a video recording. The initiated playback can be triggered, for example, by a user selecting a video file for playback in emulation mode. In some cases, the user can be a remote user of another computer system. In various cases, the video recording can be stored in the storage 135 as one or more video files. In some embodiments, the initiated playback can be on the media playback system 106 using a display coupled thereto. In other cases, the initiated playback can amount to transmitting or streaming video, as manipulated during the process 400, over a network to the user (e.g., streaming over the Internet). Publication of the video recording for display is generally described relative to blocks 404-418.

At decision block 404, the media playback module 132 determines whether there are additional video frames for processing and publication to the user for display. It should be appreciated that, in the first iteration through the decision block 404, there will typically be one or more video frames for processing. If it is determined at the decision block 404 that there are no additional video frames for processing and publication to the user for display because, for example, the playback of the video recording has completed or been terminated, the process 400 ends. Otherwise, if it is determined at the decision block 404 that there are additional video frames for processing and publication to the user for display, at block 406, the media playback module 132 receives an image representing a next video frame in the playback.

At decision block 407, the media playback module 132 determines whether to execute a process to produce adjusted gain value(s). In an example, the media playback module 132 can execute a process to produce adjusted gain value(s) at various intervals such as, for example, every video frame, every other video frame, every five video frames, etc. In another example, the media playback module 132 can execute such a process under specified conditions such as, for example, whenever image metadata exists for the image or whenever the image metadata has changed relative to a most recent set of image metadata (e.g., different exposure setting and/or gain value). Various other intervals and conditions for executing a process to produce adjusted gain value(s) will be apparent to one skilled in the art after reviewing the present disclosure. If the media playback module 132 reaches a negative determination at the decision block 407, the process 400 proceeds directly to block 416 for generation of an adjusted image using default or most recently generated adjusted gain value(s). Otherwise, if the media playback module 132 reaches a positive determination at the decision block 407, the process 400 proceeds to block 408.

At block 408, the media playback module 132 accesses image metadata associated with the image. As described previously, the image metadata can be encoded in a video file that includes the image. At block 410, the media playback module 132 discovers, from the image metadata, information related to an exposure setting and a gain value used by a camera in capture of the image. The information related to the exposure setting and the gain value can correspond to any of the types of information described above relative to FIGS. 1-3. For purposes of the example of FIG. 4, the information related to the exposure setting can be a shutter speed measured in seconds, and the camera can be, for example, the media capture component 120 of the recording device 104. In various cases, the exposure setting and/or the gain value can be included for each pixel, or specified globally for the image. In some embodiments, if the image data has already been accessed and checked, for example, as part of the determination at the decision block 407, blocks 408 and/or 410 can be omitted or subsumed within such determination.

At block 412, the media playback module 132 derives, from stored camera metadata for the camera, information related to a luminous flux associated with the exposure setting and the gain value used by the camera in the capture of the image. The media playback module 132 can derive this information for each pixel of the image, or globally for the image, in correspondence to the discovery at the block 410. Table 1 below illustrates an example of data that can be involved in the derivation. In certain embodiments, all or part of the information of Table 1 can be stored in the storage 135 as part of the camera metadata for the camera, where the camera metadata for the camera is represented as a lookup table.

TABLE 1

| EXPOSURE SETTING (SHUTTER SPEED IN SECONDS) | GAIN | LUX | MULTIPLIER |
|---|---|---|---|
| 1/30 | 256 | 1 | 1/2 |
| 1/30 | 512 | .5 | 1/4 |
| 1/30 | 1024 | .25 | 1/8 |
| 1/30 | 2048 | .125 | 1/16 |

Continuing the example from the block 410, the block 412 can involve the media playback module 132 looking up the shutter speed and the gain value in the camera metadata for each pixel of the image, or globally for the image, to derive a corresponding luminous flux per unit area measured in lux and/or a corresponding gain multiplier. In some cases, looking up the shutter speed and the gain value in this fashion can result in the corresponding luminous flux per unit area, which application logic in the media playback module 132 then uses to determine the corresponding gain multiplier. In other cases, gain multipliers can be included in the camera metadata, such that looking up the shutter speed and the gain value can directly result in the identification and retrieval of the corresponding gain multiplier. The block 412 can yield the corresponding gain multiplier.

At block 414, the media playback module 132 determines, for each pixel of the image, an adjusted gain value corresponding to a target light sensitivity using the derived information from the block 412. In some cases, such as when a single gain value is reported globally for the image, a single calculation of an adjusted gain value may suffice for all pixels of the image, such that the single calculation constitutes a determination for each pixel of the image. In an example, the media playback module 132 can multiply the gain value from the block 410 by the corresponding gain multiplier from the block 412, with the product being the adjusted gain value. In a typical embodiment, the adjusted gain value represents a reduction relative to the gain value from the block 410. This scenario corresponds to situations in which the media playback module 132 is emulating a light sensitivity of a target, such as a human, where the light sensitivity of an image sensor used in the camera is greater than that of the human visual system. It should be appreciated, however, that, in some embodiments, the adjusted gain value can represent an increase relative to the gain value from the block 410. In a typical embodiment, the block 414 yields one or more adjusted gain values.

At block 416, the media playback module 132 generates an adjusted image using the adjusted gain value(s) from the block 414. In a typical embodiment, the adjusted image is a result of performing a pixel-by-pixel gain adjustment using the adjusted gain value(s) from the block 414. At block 418, the media playback module 132 provides the adjusted image for display. The provision at the block 418 can involve transmitting or streaming to a remote user and/or actually displaying on a display coupled to the media playback system 106. From the block 418, the process 400 returns to the decision block 404 for handling of a next frame in the playback of the video recording.

Although the example of FIG. 4 is described as occurring in real-time as the video recording is played, in some embodiments, the process 400 can be conducted prior to, or separate from, the playback. For example, a process similar to the process 400 can be used to generate one or more new video files that emulates the light sensitivity of the target, where the new video file(s) can be transmitted, shared, and played back any number of times as desired. In these embodiments, the block 418 can be omitted, and blocks 404-416 can be repeated until the new video file(s) are created. Other variations will be apparent to one skilled in the art after reviewing the present disclosure.

In some embodiments, the camera metadata described with respect to FIGS. 1-4 can be used by a recording device, such as the recording device 104 of FIG. 1, to create video recordings that match a light sensitivity of a target. For example, instead of creating adjusted images after-the-fact in the fashion described relative to FIG. 4, the camera configuration module 112 can cause the recording device 104 to determine and apply adjusted gain values upon creation of a video recording, so that no later adjustment by the media playback module 132 is necessary. In these embodiments, the recording device 104 can store its own camera metadata in the storage 125, for example, and the media processor 122 can encode and create video files that include adjusted images using a process similar to the process 400 of FIG. 4.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The terms "a," "an" and other singular terms are intended to include the plural forms thereof unless specifically excluded.

What is claimed is:

1. A method of emulating light sensitivity of a human, the method comprising, for each of at least some frames of a video recording:

receiving an image;

accessing image metadata associated with the image, wherein the image metadata comprises at least one encoding of different combinations of gain values and exposure settings obtained from test image processing in a controlled lighting environment;

discovering, from the image metadata, information related to an exposure setting and a gain value used by a camera in capture of the image;

deriving, from stored camera metadata for the camera, information related to a luminous flux associated with the exposure setting and the gain value used by the camera in the capture of the image;

determining an adjusted gain value corresponding to a human light sensitivity using the derived information related to the luminous flux; and generating an adjusted image using the adjusted gain value.

2. The method of claim 1, wherein the image metadata is encoded in a video file comprising at least a portion of the video recording.

3. The method of claim 2 comprising, prior to the receiving, the camera encoding the image metadata in the video file.

4. The method of claim 1, wherein the exposure settings and the gain values are encoded into video files.

5. The method of claim 1, wherein:

the deriving comprises looking up the information related to the exposure setting and the gain value in the stored camera metadata; and the looking up yields a gain multiplier.

6. The method of claim 1, wherein:

the deriving comprises looking up the information related to the exposure setting and the gain value in the stored camera metadata; and the looking up yields a luminous flux per unit area.

7. The method of claim 1, wherein the stored camera metadata comprises a gain multiplier for each of the information related to luminous flux.

8. The method of claim 1, comprising, for at least one frame of the video recording:

determining not to execute a process to produce an adjusted gain value; and generating a new adjusted image using a most recent adjusted gain value.

9. The method of claim 1, wherein, for at least one image of the video recording, the adjusted gain value represents a reduction relative to the gain value used by the camera in the capture of the image.

10. The method of claim 1, comprising, for each of the at least some frames of the video recording, publishing the adjusted image for display.

11. The method of claim 1, wherein the exposure setting is selected from the group consisting of: shutter speed, aperture setting, and ISO speed.

12. A method of emulating light sensitivity of a human during video playback, the method comprising, by a computer system:

initiating playback of a video recording;
publishing the video recording for display responsive to the initiating, the publishing comprising, for each of at least some frames of the video recording:
receiving an image;
accessing image metadata associated with the image, wherein the image metadata comprises at least one encoding of different combinations of gain values and exposure settings obtained from test images processing in a controlled lighting environment;
discovering, from the image metadata, information related to an exposure setting and a gain value used by a camera in capture of the image;
deriving, from stored camera metadata for the camera, information related to a luminous flux associated with the exposure setting and the gain value used by the camera in the capture of the image;
determining an adjusted gain value corresponding to a human light sensitivity using the derived information related to the luminous flux; and
generating an adjusted image using the adjusted gain value; and
providing the adjusted image for display.

13. A computer system comprising a processor and memory, wherein the processor and memory in combination perform a method comprising, for each of at least some frames of a video recording:
receiving an image;
accessing image metadata associated with the image, wherein the image metadata comprises at least one encoding of different combinations of gain values and exposure settings obtained from test images processing in a controlled lighting environment;
discovering, from the image metadata, information related to an exposure setting and a gain value used by a camera in capture of the image;
deriving, from stored camera metadata for the camera, information related to a luminous flux associated with the exposure setting and the gain value used by the camera in the capture of the image;
determining an adjusted gain value corresponding to a human light sensitivity using the derived information related to the luminous flux; and
generating an adjusted image using the adjusted gain value.

14. The computer system of claim 12, wherein the exposure settings and the gain values are encoded into video files.

15. The computer system of claim 13, wherein:
the deriving comprises looking up the information related to the exposure setting and the gain value in the stored camera metadata; and
the looking up yields a gain multiplier.

16. The computer system of claim 13, wherein:
the deriving comprises looking up the information related to the exposure setting and the gain value in the stored camera metadata; and
the looking up yields a luminous flux per unit area.

17. The computer system of claim 13, the method comprising, for at least one frame of the video recording:
determining not to execute a process to produce an adjusted gain value; and
generating a new adjusted image using a most recent adjusted gain value.

18. The computer system of claim 13, the method comprising, for each of the at least some frames of the video recording, publishing the adjusted image for display.

* * * * *